(12) United States Patent
Bradley

(10) Patent No.: US 7,886,794 B2
(45) Date of Patent: Feb. 15, 2011

(54) HEATING ARRANGEMENT FOR A LAMINATOR

(75) Inventor: Samuel J. Bradley, Mundelein, IL (US)

(73) Assignee: ACCO UK Limited, Aylesbury (GB)

( * ) Notice: Subject to any disclaimer, the term of this patent is extended or adjusted under 35 U.S.C. 154(b) by 0 days.

(21) Appl. No.: 12/635,945

(22) Filed: Dec. 11, 2009

(65) Prior Publication Data
US 2010/0147467 A1     Jun. 17, 2010

(30) Foreign Application Priority Data
Dec. 11, 2008     (GB)     ................................. 0822636.7

(51) Int. Cl.
*B32B 37/00*     (2006.01)
(52) U.S. Cl. ....................... 156/359; 156/499; 156/555; 156/582; 156/583.1
(58) Field of Classification Search ................. 156/359, 156/499, 555, 580, 582, 583.1
See application file for complete search history.

(56) References Cited

U.S. PATENT DOCUMENTS

| | | | | |
|---|---|---|---|---|
| 4,416,719 | A | * | 11/1983 | Horiuchi ..................... 156/359 |
| 5,707,481 | A | * | 1/1998 | Takeda et al. ............... 156/555 |
| 5,810,965 | A | | 9/1998 | Fwu |
| 2002/0117266 | A1 | | 8/2002 | Han |
| 2004/0188023 | A1 | | 9/2004 | Sasaki et al. |
| 2005/0081978 | A1 | | 4/2005 | Britz |
| 2005/0247405 | A1 | | 11/2005 | Murphy et al. |
| 2006/0162841 | A1 | | 7/2006 | Hong |
| 2010/0181027 | A1 | * | 7/2010 | Bradley et al. .............. 156/359 |

FOREIGN PATENT DOCUMENTS

| | | |
|---|---|---|
| DE | 10056068 | 5/2002 |
| JP | 56126124 | 10/1981 |
| WO | 82/03356 | 10/1982 |

OTHER PUBLICATIONS

United Kingdom Search Report for patent application GB0822636.7, Jul. 21, 2009, 2 pages.

* cited by examiner

*Primary Examiner*—James Sells
(74) *Attorney, Agent, or Firm*—Michael Best & Friedrich LLP

(57) ABSTRACT

A laminating arrangement includes a laminating roller and a radiating element to radiate energy therefrom. A reflector has a main body and is configured so that energy radiated from the radiating element is reflected and concentrated to exit the reflector in a direction towards the laminating roller. A thermal connector has first and second ends, the first end being in thermal contact with the main body of the reflector. When the radiating element is switched on, and the temperature of the second end of the thermal connector and the temperature of the surface of the laminating roller are approximately equal and below an optimal laminating temperature, the temperature of the second end of the thermal connector rises at substantially the same rate as the surface of the laminating roller. A thermometer is positioned to measure the temperature of the thermal connector at or near the second end.

13 Claims, 1 Drawing Sheet

HEATING ARRANGEMENT FOR A LAMINATOR

BACKGROUND

The present invention relates to a heating arrangement, and in particular concerns a heating arrangement for heating rollers to be used in a laminating apparatus.

It is known to provide laminating devices having a pair of heated rollers. Typically, plastic pouches are provided for use with such a device, the pouches comprising two square or rectangular regions of transparent or translucent plastic which are overlaid on one another and sealed together at one edge. The surfaces of the sheets that face one another are at least partly covered with a thermally-activated glue, which is not adhesive at room temperature but which becomes adhesive at elevated temperatures.

A sheet of paper or card, which is slightly smaller than either of the transparent sheets, is placed within the pouch so that one edge of the paper or card abuts the sealed edge of the pouch. The transparent sheets are then laid flat against either side of the sheet of paper or card, with opposing edges of each sheet projecting slightly beyond each edge of the sheet of paper or card.

The pouch is then passed between a pair of heated rollers, which raise the temperature of the glue, thus activating the glue and causing the transparent sheets to adhere to the surfaces of the paper or card and, where the transparent sheets meet, to each other. The sheet of paper or card is then laminated within the pouch.

Conventionally, heating of each roller is achieved by providing a relatively heavy aluminum shoe, which has a curved inner surface lying close to a region of the roller. When the laminating device is switched on, the shoe is heated, usually by resistance heating, and heat energy is transferred from the shoe to the roller by radiation and convection.

Whilst heating the rollers by this technique has been found to be effective, a relatively long length of time that is taken for the rollers to reach working temperature. For instance, a typical machine will not be ready to perform laminating operations for around five to seven minutes after being switched on. For domestic, business and industrial users, this lag is undesirable, and there is a general need for laminating machines which are ready for use more quickly after being switched on.

More recently, it has been proposed to heat the rollers using radiated heat from a lamp or other source of radiation, particularly in frequencies around the near infra red (IR) region of the electromagnetic spectrum, and more particularly within the wavelength range from 700 nm to 2 µm. Using such techniques, the outer surface of each roller can be heated to a high temperature very quickly. It is, however, difficult to control the heating that is imparted to rollers using this technique.

Furthermore, it is crucial that overheating of the rollers does not take place. Rollers of a laminating machine generally comprise a stiff metal cylinder, which is covered with a thin coating of silicone. Silicone is relatively soft, and may be compressed to some extent, thus allowing different shapes and thicknesses of objects to be laminated.

If the silicone covering is heated beyond a certain temperature, however, the silicone will be permanently damaged, losing its elasticity and rendering the roller (and hence, generally, the entire machine) useless.

SUMMARY

It is an object of the present invention to seek to provide an improved laminating device of this type.

According to one aspect of the present invention, there is provided a laminating arrangement comprising a laminating roller; a radiating element adapted to radiate energy therefrom; a reflector, having a main body, and being configured and positioned so that energy radiated from the radiating element is reflected and concentrated so as to exit the reflector in a direction towards the laminating roller; a thermal connector, having first and second ends, the first end being in thermal contact with the main body, the arrangement being such that when the radiating element is switched on, and the temperature of the second end of the thermal connector and the temperature of the surface of the laminating roller are approximately equal and below an optimal laminating temperature, the temperature of the second end of the thermal connector rises at substantially the same rate as the surface of the laminating roller; and a thermometer positioned to measure the temperature of the thermal connector at or near the second end thereof.

Preferably when the radiating element is switched off, and the temperature of the second end of the thermal connector and the temperature of the surface of the laminating roller are approximately equal and are above or similar to the optimal laminating temperature, the temperature of the second end of the thermal connector decreases at substantially the same rate as the temperature of the surface of the laminating roller.

Advantageously the thermal connector is formed from a material having a lower thermal conductivity than the material from which the main body is formed.

Conveniently, the radiating element has an on-state and an off-state, and wherein the roller is rotated whenever the radiating element is in the on-state.

Preferably, the laminating roller and at least the second end of the thermal connector are located substantially within a housing.

Advantageously, the housing is the main housing of the laminating device.

Other aspects of the invention will become apparent by consideration of the detailed description and accompanying drawings.

DETAILED DESCRIPTION

Figure 1:
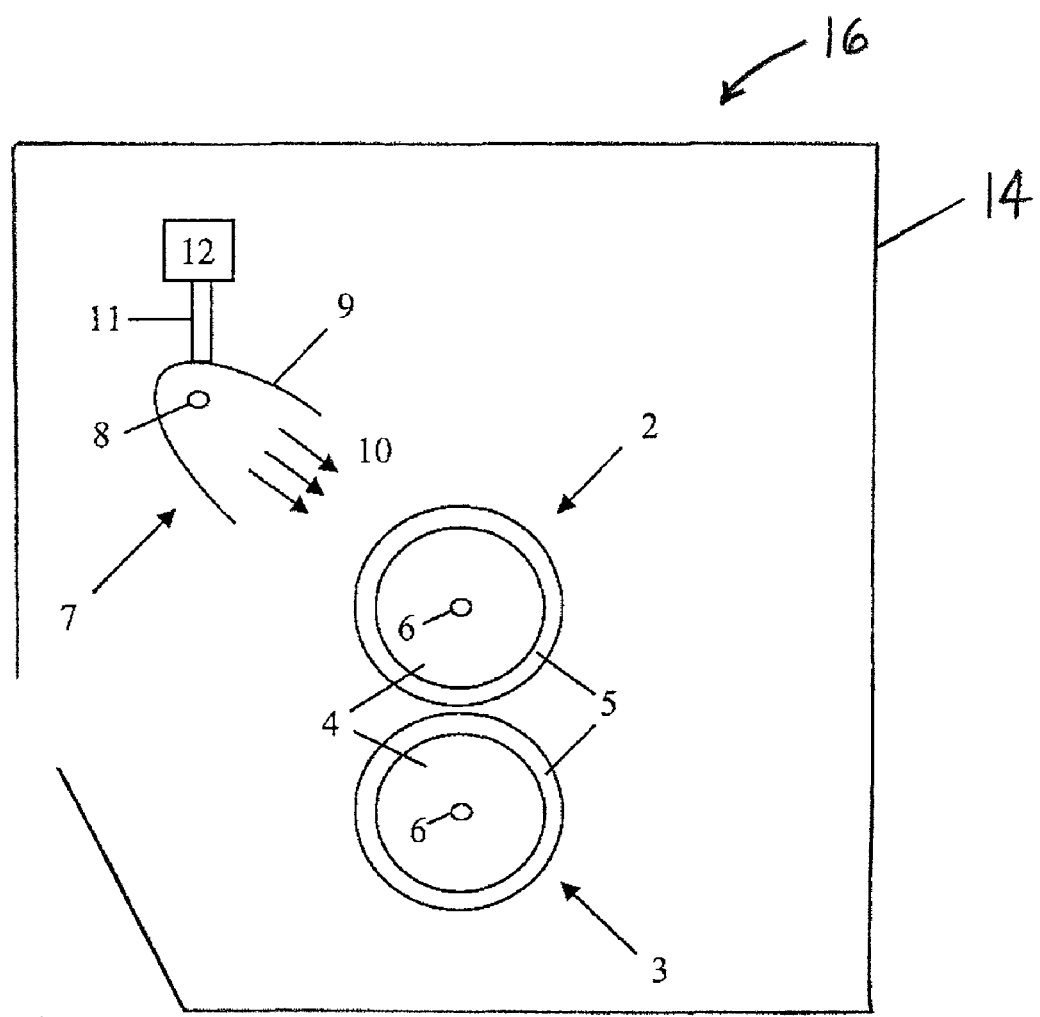
FIG. 1 is a schematic view of components of a laminating device embodying the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Turning to FIG. 1, a pair of rollers 2,3 is shown. The rollers 2,3 form part of a laminating device 16.

Each roller comprises a solid core 4, made from a material such as steel, with a relatively thin silicone covering 5 being formed around the core 9. The thickness of the silicone covering 5 with the respect to the core is exaggerated in FIG. 1 for the purposes of clarity.

The rollers 2, 3 are parallel with one another, and are preferably biased into contact with one another by means of spring-loaded elements (not shown). The rollers 2,3 are rotatable around respective spindles 6, and may be driven to rotate in opposite directions by a gearing system (not shown), which is in turn connected to a drive motor. With reference to FIG. 1, the upper roller 2 will be driven in an anti-clockwise direction, and the lower spindle 3 will be driven in a clock-wise direction, so that items to be laminated may be drawn between the rollers 2,3 from left to right.

A halogen lamp 7 is provided to radiate heat energy above the upper roller 2, to heat this roller 2. It will be understood that a corresponding heating arrangement may be provided for the lower roller 3, although for the purposes of clarity this has not been illustrated.

The halogen lamp 7 comprises an elongate halogen bulb 8. In preferred embodiments of the invention, the halogen bulb 8 is approximately of the same length as the upper roller 2, and is arranged to be substantially parallel therewith.

A reflector 9 is provided around the halogen bulb 8. The reflector 9 is formed from a reflective material, and it is preferred to use a relatively thin, bright material such as aluminum. The reflector is preferable arranged so that radiation emitted from the halogen bulb 8 is reflected from internal surfaces of the reflector 9, and is concentrated so as to exit the reflector 9 in a particular direction. With reference to FIG. 1, the reflector 9 is arranged so that radiated energy is reflected to leave the reflector 9 in a direction directly towards the upper roller 2, as indicated by the arrows 10. It will be understood that at least a part of the cross-section of the reflector 9 may be parabolic. Preferably, the reflector 9 is also elongate, is approximately the same length as the halogen bulb 8, and is arranged to be parallel with the halogen bulb 8, having a substantially consistent cross-sectional shape along its length. The reflector 9 is therefore generally trough shaped.

The halogen lamp 7 is arranged to radiate heat energy towards the upper roller 2 so that, when the upper roller 2 is rotating as discussed above, the region of the upper roller 2 that is about to pass closest to the lower roller 3 is heated. The reason for this is that, when the rollers 2,3, come into contact with an object to be laminated, heat energy is transferred from the rollers 2,3 to the object, and this has the effect of cooling the rollers 2,3 down. The surfaces of the rollers 2,3 will, of course, also continually be losing heat to their surroundings. It is therefore desirable to heat up regions of the surfaces of the rollers 2,3 just before they come into contact with an object to be laminated.

A thermal connector 11 is provided in thermal contact with the reflector 9. The thermal connector 11 comprises a quantity of a material that conducts heat, but which will heat up and cool down significantly more slowly than the reflector 9.

As mentioned above, the reflector 9 will, in general, be formed from a thin, light sheet of a reflective material, such as aluminum. Because the reflector 9 has a relatively large surface area and small thickness, the reflector 9 will heat up to a maximum temperature very rapidly once the halogen bulb 8 is activated. Whilst some of the energy radiated by the halogen bulb 8 will be reflected by the reflector 9 and directed towards the roller 2, some of the energy will be absorbed by the reflector 9, contributing heavily to this heating.

Furthermore, when the halogen bulb 8 is switched off, the reflector 9 will cool down very swiftly, as heat will be efficiently radiated and conducted away from the reflector 9, due to the small thickness and large surface area of the reflector 9.

By contrast, the thermal connector 11 is formed to heat up and cool down more slowly than the reflector 9. The thermal connector 11 may, for example, be formed to have a relatively thick, solid metal body, that can take the form of a metal cylinder. Because the metal cylinder will have a far greater volume to surface area ratio than the reflector 9, the thermal connector 11 will heat up far more slowly than the reflector 9, and will also cool down far more slowly.

The thermal connector 11 may be made from a material that has a significantly higher specific heat capacity than the material from which the reflector 9 is made. The specific heat capacity of material is a measure of the amount of heat energy that must be gained or lost in order for a given mass of the material to change temperature by 1° K. Forming the thermal connector 11 from a material having a relatively high specific heat capacity will, therefore, help to ensure that the thermal connector 11 heats up and cools down more slowly than the reflector 9. It is, however, not essential that the thermal connector 11 is formed from a material having a higher specific heat capacity than that of the reflector 9.

The surface area of the region of thermal contact between the reflector 9 and the thermal connector 11 may also be relatively small, thus preventing a rapid flow of heat energy from the reflector to the thermal connector 11.

In preferred embodiments of the invention, the thermal connector 11 has a first end and a second end, with the first end being in thermal contact with the reflector 9. A thermometer 12 is provided in thermal contact with the thermal connector 11, at or near the second end thereof. The thermometer 12 is not in direct thermal contact with the reflector 9.

When the laminating device 16 is first switched on, the halogen lamp 8 will be illuminated, and radiation therefrom will be concentrated onto the surface of the roller 2 by the reflector 9. The roller 2 will be rotated at a relatively high rate while the halogen lamp 8 is illuminated, to prevent one portion of the surface of the roller 2 from being excessively heated. The silicone cover 5 of the roller 2 will be heated relatively slowly, however, and will not reach its maximum operating temperature for around one to three minutes. For a typical laminating device, the optimal operating temperature for the surfaces of the rollers is around 110° C.

The reflector 9 will, however, heat to its maximum temperature much more rapidly than this, possibly within a few seconds.

Measuring the temperature of the reflector 9 is, therefore, not a practical way of gauging the temperature of the surface of the roller 2, since the reflector 9 will heat up far more quickly than the surface of the roller 2. The temperature of the surface of the roll 2 will continue to rise after the reflector 9 has reached its maximum temperature.

In accordance with the present invention, the temperature of the second end of the thermal connector 11 is measured by the thermometer 12, and the properties of the thermal connector 11 are selected so that the second end of the thermal connector 11 will heat up at substantially the same rate as the surface of the roller 2 when the halogen lamp 8 is illuminated. In preferred embodiments, as the surface of the roller 2 and the second end of the thermal connector heat up, the temperatures of these components will remain within around 5° C. of one another. More preferably, the temperatures will remain within 3° C. of one another. Preferably, this is at least the case when the temperatures of the second end of the thermal connector 11 and the surface of the roller 2 are approximately equal (preferably within 5° C. of one another), and are lower than the optimal laminating temperature. More preferably, this is at least the case if these temperatures are above room temperature.

The temperature of the second end of the thermal connector 11 will, therefore, provide an indirect indication of the temperature at the surface of the roller 2, and hence will allow a processor or controller (not shown) of the laminating device 16 to determine when the surface of the roller 2 is at a sufficient temperature for a laminating operation to begin.

It is envisaged that the properties of the thermal connector 11 that allow the second end of the thermal connector 11 to warm up at substantially the same rate as the surface of the roller 2 may be determined through a calibration process. A temperature sensor may be placed on the surface of the roller 2, and the halogen bulb 8 may then be switched on. The temperature at the second end of the thermal connector 11 may be compared to the temperature of the surface of the roller 2, and the length, diameter, mass, coating and/or surface coloring of the thermal connector 11 may be adjusted to alter the rate at which the second end of the thermal connector 11 heats up, so that the temperature sensed by the thermometer 12 following switching on of the halogen bulb 8 which corresponds more closely to the temperature of the surface of the roller 2.

The temperature at the second end of the thermal connector 11 may also be used to determine whether the roller 2 is likely to be over-heated and a cooling mechanism, such as a fan (not shown) may be activated.

Preferably, the laminating device 16 is provided with a "ready" lamp to indicate to a user of the device that the device is ready to perform a laminating operation. Before it is determined that the surface of the roller 2 has reached an appropriate operating temperature, the ready lamp may be extinguished, or may be illuminated in a color, such as red, which indicates that the laminating device 16 is not to be used. When it is determined that the surface of the roller 2 has reached an appropriate operating temperature, the ready lamp may be illuminated, or may be illuminated in a different color (for instance, green) to indicate to a user that the device is ready to perform laminating operations.

In preferred embodiments, the properties of the thermal connector 11 are also selected so that, when the halogen lamp 8 is switched off, the second end of the thermal connector 11 cools down at a rate that is substantially the same as the rate of cooling of the surface of the roller 2. Once again, it is preferred that the temperatures of these components remain within around 5° C. of one another during this cooling phase. More preferably, the temperatures remain within 3° C. of one another. Preferably, this is at least the case if the temperatures of the second end of the thermal connector 11 and of the surface of the roller 2 are greater than, or similar to, the optimal laminating temperature. More preferably, this is the case at least when these temperatures are above room temperature.

This will further allow the processor to monitor, indirectly, the temperature at the surface of the roller 2 after the halogen lamp 8 has been extinguished.

Once again, the size, mass, length, shape, coating and external color of the thermal connector 11 will determine the cooling characteristics thereof, an these properties may be selected, and adjusted during the calibration process, in many different ways to arrive at the desired cooling characteristics.

It will be understood that the rate of cooling of an object will depend on the difference in temperature between the object and its surrounding. For this reason, it is preferred that the thermal connector is wholly or substantially within a housing 14 that also contains the roller 2, as the ambient surroundings of the thermal connector 11 and the roller 2 will therefore be equal or almost equal. Preferably, this housing 14 comprises the main outer housing of the laminating device 16 itself.

If the laminating device 16 is switched off following a laminating operation, and is subsequently switched on again before the surface of the roller 2 has returned to room temperature, the temperature of the second end of the thermal connector 11 will provide a reliable guide as to the temperature of the surface of the roller 2 at switch-on, and hence to the amount of re-heating that is needed to return the roller 2 to its operating temperature.

Selecting the characteristics of the thermal connector 11 to ensure that the thermal connector 11 cools at substantially the same rate as the surface of the roller 2 will allow the processor to control the operation of the halogen lamp 8 so that the lamp 8 may be switched on and off, or otherwise controlled, to maintain the temperature of the roller 2 within an acceptable range for laminating operations to be carried out.

It is appreciated that, as laminating operations are carried out, thermal energy will be removed from the rollers 2,3 as heat is transferred to pouches or other items to be laminated that pass between the rollers 2,3. It is, however, anticipated that the cooling effect on the rollers 2,3 will be sufficiently small that it can be ignored for these purposes.

It will be appreciated that embodiments of the present invention may provide a robust and effective arrangement for determining whether a laminating device is ready for use.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Various features and advantages of the invention are set forth in the following claims.

What is claimed is:

1. A laminating arrangement comprising:
    a laminating roller;
    a radiating element adapted to radiate energy therefrom;
    a reflector, having a main body, and being configured and positioned so that energy radiated from the radiating element is reflected and concentrated so as to exit the reflector in a direction towards the laminating roller;
    a thermal connector, having first and second ends, the first end being in thermal contact with the main body, the arrangement being such that when the radiating element is switched on, and the temperature of the second end of the thermal connector and the temperature of the surface of the laminating roller are approximately equal and below an optimal laminating temperature, the temperature of the second end of the thermal connector rises at substantially the same rate as the surface of the laminating roller; and
    a thermometer positioned to measure the temperature of the thermal connector at or near the second end thereof.

2. A laminating arrangement according to claim 1, wherein, when the radiating element is switched off, and the temperature of the second end of the thermal connector and the temperature of the surface of the laminating roller are approximately equal and are above or similar to the optimal laminating temperature, the temperature of the second end of the thermal connector decreases at substantially the same rate as the temperature of the surface of the laminating roller.

3. A laminating arrangement according to claim 1, wherein the thermal connector is formed from a material having a lower thermal conductivity than the material from which the main body is formed.

4. A laminating arrangement according to claim 1, wherein the radiating element has an on-state and an off-state, and wherein the roller is rotated whenever the radiating element is in the on-state.

5. A laminating arrangement according to claim 1, wherein the laminating roller and at least the second end of the thermal connector are located substantially within a housing.

6. A laminating arrangement according to claim 5, wherein the housing is the main housing of the laminating device.

7. A laminating arrangement according to claim 1, wherein the radiating element is a halogen lamp.

8. A laminating arrangement according to claim 1, wherein the thermal connector is a solid metal body.

9. A laminating arrangement according to claim 8, wherein the thermal connector is a cylinder.

10. A laminating arrangement according to claim 1, wherein the temperature of the second end of the thermal connector and the temperature of the roller remain within about 5° C. of one another as the roller is heated.

11. A laminating arrangement according to claim 10, wherein the temperature of the second end of the thermal connector and the temperature of the roller remain within about 3° C. of one another as the roller is heated.

12. A laminating arrangement according to claim 2, wherein the temperature of the second end of the thermal connector and the temperature of the roller remain within about 5° C. of one another as the roller cools.

13. A laminating arrangement according to claim 12, wherein the temperature of the second end of the thermal connector and the temperature of the roller remain within about 3° C. of one another as the roller cools.

* * * * *